Oct. 19, 1965   E. F. KATZENBERGER   3,212,737
EXPANDABLE POD FOR A HELICOPTER
Filed March 31, 1964                           2 Sheets-Sheet 1
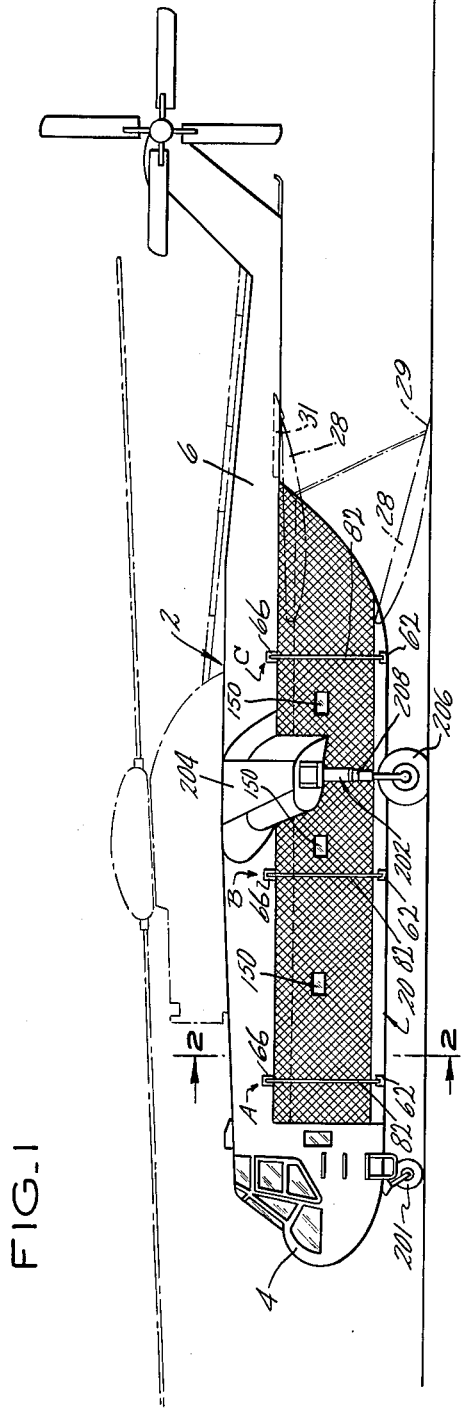
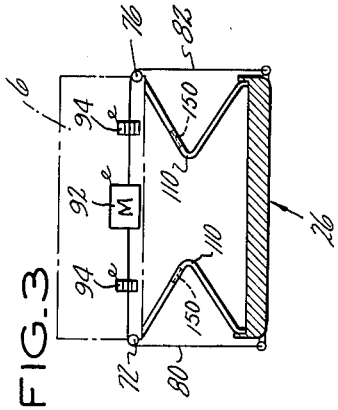
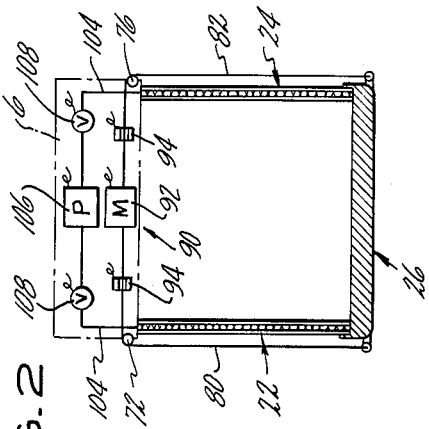
INVENTOR
EDWARD F. KATZENBERGER
BY
AGENT Oct. 19, 1965   E. F. KATZENBERGER   3,212,737
EXPANDABLE POD FOR A HELICOPTER
Filed March 31, 1964   2 Sheets-Sheet 2

INVENTOR
EDWARD F. KATZENBERGER
BY   AGENT

United States Patent Office 3,212,737
Patented Oct. 19, 1965

3,212,737
EXPANDABLE POD FOR A HELICOPTER
Edward F. Katzenberger, Westport, Conn., assignor to United Aircraft Corporation, East Hartford, Conn., a corporation of Delaware
Filed Mar. 31, 1964, Ser. No. 356,289
13 Claims. (Cl. 244—137)

This invention relates to an expansible pod for a crane helicopter.

It is an object of this invention to provide a pod for a crane helicopter which can be positioned against the lower contour of the supporting structure of the crane when it is not in use. This would make the space below the stowed pod available for other purposes such as in a regular crane.

It is another object of this invention to provide a pod having collapsible or retractable sides so that the pod can be moved between an extended pod position and a retracted stowed position.

A further object of this invention is to provide cable means for supporting the rigid bottom of the collapsible pod and for raising and lowering it.

Another object of this invention is to provide pump means for inflating the inflatable portions of a pod so as to provide some rigidity for the pod in its operative or passenger receiving cargo position.

A further object of this invention is to provide motor means for raising or lowering the bottom of the retractable pod between an extended pod position and a stowed pod position.

Another object of this invention is to provide means for insuring that the collapsible sides are folded to permit moving of the bottom of the pod to a position which is as close to the bottom of the fuselage as possible.

A further object of this invention is to provide means for guiding the bottom of the pod upwardly into position permitting some degree of movement while permitting the bottom of the pod to be isolated in its extended position from vibration of the fuselage.

Another object of this invention is to provide means for letting the air out of the inflatable sides of the pod when it is being moved into its retracted or stowed position.

A further object of this invention is to provide an opening in the floor of the pod so that a hook and cable from a winch may be passed therethrough. In this way when the pod is in its retracted position the helicopter can perform as a helicopter without a pod.

Other objects and advantages will be apparent from the specification and claims and from the accompanying drawings which illustrate an embodiment of the invention.

FIGURE 1 is a side view of a crane helicopter showing the pod in its inflated position;

FIGURE 2 is a schematic view taken along the line 2—2 of FIGURE 1;

FIGURE 3 is a schematic sectional view showing the pod in an intermediate position between its inflated and deflated positions;

FIGURE 4 is a cross-sectional schematic view showing the pod in its deflated and stowed position;

Figure 5:
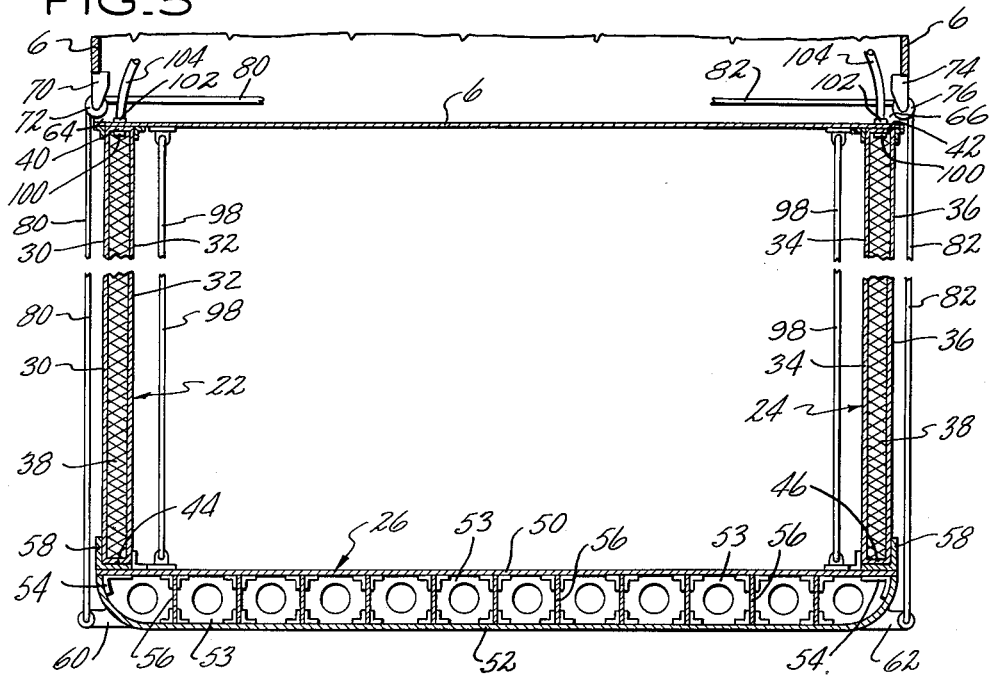
FIGURE 5 is an enlarged view showing details through an intermediate section of the pod structure.
Figure 6:
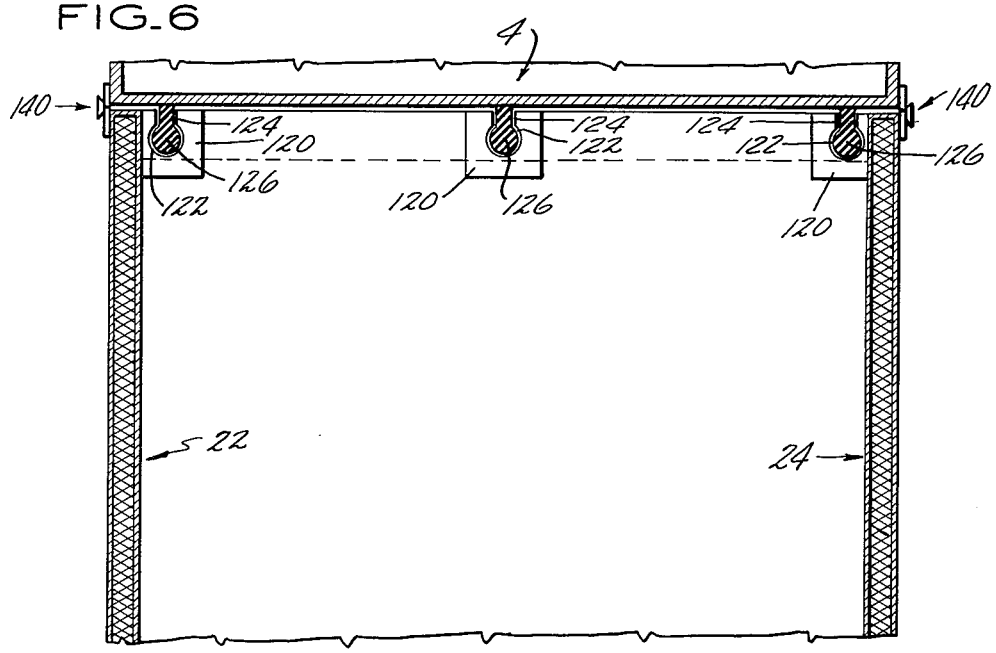
FIGURE 6 is a longitudinal section taken through the forward part of the pod adjacent the downwardly extending cabin portion of the helicopter.

A crane helicopter of the type shown in FIGURE 1 is also shown in U.S. application Serial No. 250,631, now Patent No. 3,176,939, and U.S. application Serial No. 250,632, now Patent No. 3,176,940. In these applications, the crane helicopter is shown having a rigid pod for transporting cargo or passengers. A crane helicopter is also shown in Design Patent No. 193,492.

As shown in FIGURE 1, the crane helicopter comprises a fuselage 2 having a pilot's compartment 4 extending downwardly from the forward part of a long beam-like portion 6. The landing gear comprises a nose wheel 201 which extends downwardly from the bottom of the pilot's compartment 4 and a pair of side units 202. Each side unit 202 is connected to the end of an outwardly extending section 204 from the fuselage portion 6. Each side unit 202 comprises a shock absorbing strut 208 having a wheel 206 located at its lower end. Further, the engine, main rotor, transmission, and other related power plant and flight components have been shown in phantom or omitted to limit the drawings to the invention.

The pod 20 is attached to the crane helicopter so as to provide an enclosed area behind the pilot's compartment and under the beam-like portion 6. As viewed in FIGURE 2, the pod is shown in its extended and inflated position and this view represents a general cross-sectional view of the pod from its forward end to its rearward end where the rear loading door is attached and the sides begin to taper upwardly to the beam-like portion 6.

The pod 20 comprises essentially two sides 22 and 24, a rigid bottom 26 and a rear loading door 28. The upper edge of each side 22 and 24 is fixed to the under portion of the beam-like portion 6 at 40 and 42, respectively, adjacent its cooperating side edge. This attachment can be by any known means such as by a series of snaps or by a full length zipper. The sides 22 and 24 are formed like an airmat which has its parallel sides 30 and 32 and 34 and 36, respectively, held together by inner laced string members 38. While cross lacing has been shown, other spacing means can be used. The lower edges of each side 22 and 24 are fixed to the rigid bottom 26 of the pod at 44 and 46, respectively, adjacent its cooperating side edge. This fixing means can be by any known means such as by a series of snaps or a full length zipper.

The rigid bottom 26 is formed having an inner floor plate 50 and an outer plate 52 spaced therefrom with curved ends which are turned inwardly and attached to the ends of the floor plate 50. This is done such as by brazing with angular members 54. The rigid bottom has stringer members 56 fixed between the members 50 and 52 to reinforce them and give shape to the member 52. A plurality of lateral members 53 extend between the stringer members 56 for added rigidity. Longitudinal angular members 58 are provided along each side of the rigid bottom 26 so that the upwardly projecting portions thereof will form a partial closure for the sides 22 and 24 when the pod is placed in its deflated poistion (see FIG. 4).

The rigid bottom 26 of the collapsible pod is supported by cable means in its extended position with said cable means being capable of moving the rigid bottom 26 between its extended position and retracted position. A plurality of cable supporting and positioning means are located along the length of the pod. In FIGURE 1 these are located in positions A, B and C.

Brackets 60 and 62 are located extending outwardly from each side, respectively, of the rigid bottom 26 below each of the positions A, B and C. Openings 64 and 66 are provided along the sides, respectively, of the beam-like portion 6 of the fuselage 2 adjacent the lower edge thereof at each of positions A, B and C. A bracket 70 is fixed to the fuselage in each of the openings 64 so that it supports a pulley 72 and a bracket 74 is fixed to the fuselage in each of the openings 66 so that it supports a pulley 76.

A cable 80 extends from each opening 64 over its pulley 72 and is attached to its cooperating bracket 60 while a cable 82 extends from each opening 66 over its pulley 76 and is attached to its respective bracket 62. The inner end of each of the cables 80 and 82 is attached to motor means 90 for winding the cable in one direction so as to move the rigid bottom 26 up to a position directly under the beam-like portion 6 or to permit the cable to move in the other direction so that the rigid bottom 26 can move downwardly to its lowest position which places the pod in its fully extended position.

Each motor means 90 includes a motor unit 92 fixed to the fuselage. Each motor 92 has an operative connection to a control panel in the pilot's compartment so that actuation of the motor is under control of the pilot. This construction can be one in which the motor 92 is an electric motor and electrical wires extend to the pilot's compartment with a switch being movable between an "up," "down" and "off" position. Between the motor 92 and each of its respective pulleys 72 and 76 a braking device 94 is located which clamps on to the cooperating cable when the pilot's switch is in the "off" position. This prevents the cables from placing a torque on the motor when it is in its extended and loaded position.

To further aid in supporting the bottom of the pod a rod 98, or fixed cable length, can be positioned between a bracket on the bottom of the beam-like portion 6 of the fuselage 2 and a bracket on the upper surface of the inner floor plate 50. Provisions can be made for as many of these as necessary for a particular load being carried.

When the pod is in a position with its rigid bottom in its lowest position, which is the extended position of the pod, the sides 20 and 24 which are made so as to be airtight, can be filled with air through valve means to produce more rigidity in the side wall structure. In fixing the sides of the pod to the under portion of the beam-like member 6, valve members 100 in the upper edge of the walls of the sides of the pod are connected to cooperating portions 102 in the lower surface of the beam-like portion 6. Conduits 104 extend to a pump 106 which is located in the fuselage. Pump 106 has its control operatively connected to the pilot's compartment so that it is under control of the pilot. Valve means 108 is provided in each of the conduits 104 to connect the conduits to atmosphere when the rigid bottom 26 is being raised to its upper position placing the pod in its retracted or deflated position. This valve means 108 is also under control of the pilot although it can be connected to a motor 92 so that as the switch for the motor is placed in its "up" position, the valve means is connected to atmosphere.

Each of the sides 22 and 24 is pleated at 110 so as to tend to bend at that point. Windows 150 are provided above the pleat. This is to provide for a neat folding which will permit the rigid bottom to move into its proper position as shown in FIGURE 4. Known spring means can also be provided which would initiate the folding action of the sides in a proper manner and tend to maintain the sides in a proper position while folding. This could consist of rod-like members extending down the sides with each rod being pivoted at its center point with a wrap-around spring tending to move the rods about their center points inwardly.

The rear of the pod is formed having a rigid ramp or loading door 28 pivotally attached to the rear edge of the rigid bottom 26. This rear loading door can be moved between its open and closed position by a winch or any other method. Latch means 31 are provided on the underside of the beam-like portion 6 to connect the end 29 of the rear loading door 28 thereto in either the extended or retracted position of the pod.

The front of the pod is formed with the rigid bottom having reinforced sections 120 with openings 122 therein having narrower slots 124 connecting the openings to the front of the rigid bottom. These openings and slots each receive a cooperating mating track member 126 which extends rearwardly from the back of the pilot's compartment 4. These members 126 extend for the heighth of the pod and guide the front end of the rigid bottom as it is moved between its upper and lower positions. These track members 126 are formed of a rubber-like material so that a small degree of movement is permitted between the rigid bottom 26 and the pilot's compartment 4 while a guiding function is insured. A zipper means 140 is provided between the mating portion of the pilot's compartment 4 and the forward edge of the sides 22 and 24. In the event a more airtight forward end is desired within the pod, other closure means connected to the pod can be used. It is to be noted that if there are projections from the rear part of the pilot's compartment 4 the rigid bottom 26 can be contoured so as to receive these projections.

When the pod is in its retracted or stowed position, the crane helicopter can be used for one of its purposes of lifting and towing by a single cable from a winch located in the beam-like structure 6 by allowing the hook and cable from the winch to be lowered through an opening in the rigid bottom 26 below the location of the winch. When the winch is not being used and the cable is fully rotated thereon, the hole in the rigid bottom 26 is closed by a cover.

*Operation*

When a crane helicopter having an inflatable or extensible pod in the retracted position is to be used, the pilot places the switch means for the motors 92 from the "off" position to the "down" position and since the braking devices 94 are moved to an unclamped position, the rigid bottom 26 of the pod is lowered to its lowest position representing the fully extended position of the pod. The pilot then moves the switch means to its "off" position which while turning off the motors also clamps the braking devices on to the cables 80 and 82. The pump means 106 is then turned on and air under pressure is directed into the sides 22 and 24 of the pod. To prevent placing an undue stress on these cables or the motors 92, a plurality of rods 98 can be placed in position throughout the pod in the event heavy loads are anticipated.

When the pod is in its extended position and it is desired to have it move to its retracted position, the pilot places the switch means for the motors 92 from the "off" position to the "up" position and since the braking devices 94 are moved to an unclamped position, the rigid bottom 26 of the pod is raised to its upper position representing the retracted position of the pod. Rods 98 are removed before this operation if any are in holding position. The sides of the pod being folded inwardly at their folds to permit the rigid bottom to be moved as close to the under part of the beam-like portion 6 as possible. As the motors 92 had their switch means moved to the "up" position, the valve means 108 was opened to permit the air to be released from the inner boundaries of the sides 22 and 24.

It is to be understood that the invention is not limited to the specific description above or other specific figures, but may be used in other ways without departure from its spirit as defined by the following claims.

I claim:

1. A crane helicopter having a fuselage with an elongated section, a collapsible pod connected to said elongated section which can be moved between an extended pod position and a retracted stowed position, and means for moving said pod between its extended and stowed positions.

2. A lifting vehicle having an elongated body capable of carrying a load from one landing location to another, a load-carrying platform connected to said body and movable between a stowed position juxtaposed to said body and an operative position spaced downwardly from said body, means for moving said platform between said positions, and closure means connected to said platform and said body cooperating with said body and said platform to form a substantially closed load-carrying chamber when said platform is in the extended position.

3. A lifting vehicle having an elongated body capable of carrying a load from one landing location to another, a load-carrying platform connected to said body and movable between a stowed position juxtaposed to said body and an operative position spaced downwardly from said body, means for moving said platform between said positions, and closure means connected to said platform and said body cooperating with said body and said platform to form a substantially closed load-carrying chamber when said platform is in the extended position, said closure means being sufficiently flexible to have only a small exposed area in the stowed position of said platform.

4. A helicopter having a fuselage with a beam-like portion, a platform located beneath said portion, means connecting said platform to said fuselage, said connecting means including means for raising and lowering said platform, a side extending between the fuselage and each side edge of the platform, both sides being collapsible and extendable so as to permit said platform to be raised and lowered.

5. A crane helicopter having a fuselage with a longitudinal beam-like structure, a pilot's compartment extending downwardly from said beam-like structure, a platform, cable means suspending said platform below said beam-like structure and on one side of said pilot's compartment, a first collapsible side connecting one side of said beam-like structure to the side of said platform therebelow, a second collapsible side connecting the other side of said beam-like structure to the side of said platform therebelow, and means for moving said platform between a lower position forming a pod with its sides and a higher position where it forms the bottom of the beam-like structure of the helicopter.

6. A helicopter having a fuselage with a beam-like portion, a platform located beneath said portion, means connecting said platform to said fuselage, said connecting means including means for raising and lowering said platform, a side extending between the fuselage and each side edge of the platform, both sides being collapsible and extendable so as to permit said platform to be raised and lowered, each side being constructed so that it can be filled with air when it has been extended to increase its rigidity, pump means in said fuselage, conduit means connecting said pump means to said sides.

7. A helicopter having a fuselage with a longitudinal beam-like structure, a platform, means for moving said platform between a position where it is spaced downwardly from said beam-like structure and a position where it is placed under the beam-like structure and adjacent thereto, said moving means including a plurality of cables on each side of said fuselage having one end connected to the edge of said platform, an opening located in the beam-like structure above each point where the cable is connected to the platform, a pulley located in each of said openings, each of said cables extending over its cooperating pulley located above its attachment to the platform and extending through the opening into the fuselage of the helicopter, motor means in said helicopter for pulling in or letting out each of the cables to either raise said platform or lower it, a collapsible wall located between each lower side edge of said beam-like structure and the edge of said platform located therebelow.

8. A helicopter having a fuselage with a longitudinal beam-like structure, a platform, means for moving said platform between a position where it is spaced downwardly from said beam-like structure and a position where it is placed under the beam-like structure and adjacent thereto, said moving means including a plurality of cables on each side of said fuselage having one end connected to the edge of said platform, an opening located in the beam-like structure above each point where the cable is connected to the platform, a pulley located in each of said openings, each of said cables extending over its cooperating pulley located above its attachment to the platform and extending through the opening into the fuselage of the helicopter, motor means in said helicopter for pulling in or letting out each of the cables to either raise said platform or lower it, brake means for holding each cable in position when the motor means is not operating, a collapsible wall located between each lower side edge of said beam-like structure and the edge of said platform located therebelow.

9. A crane helicopter having:
(a) a fuselage with an elongated section,
(b) a collapsible pod connected to said elongated section which can be moved between an extended pod position and a retracted stowed position,
  (1) said collapsible pod including a load-carrying platform movable between an extended pod position and a retracted stowed position adjacent said elongated section,
  (2) closure means connected between said platform and said elongated section to form a substantially closed load-carrying chamber when said platform is in the extended position,
  (3) said closure means being collapsible to the extent that it does not interfere with the movement of said platform between its extended position and its stowed position, and
(c) means for moving said pod between its extended and stowed positions,
  (1) said means including connections between said load-carrying platform and said elongated section.

10. A crane helicopter having:
(a) a fuselage with an elongated section,
(b) a collapsible pod connected to said elongated section which can be moved between an extended pod position and a retracted stowed position,
  (1) said collapsible pod including a load-carrying platform movable between an extended pod position and a retracted stowed position adjacent said elongated section,
  (2) closure means connected between said platform and said elongated section to form a substantially closed load-carrying chamber when said platform is in the extended position,
  (3) said closure means having sides which fold and unfold as the platform moves between its extended pod position and retracted stowed position, and
(c) means for moving said pod between its extended and stowed positions,
  (1) said means including connections between said load-carrying platform and said elongated section.

11. A crane helicopter having:
(a) a fuselage with an elongated section,
(b) a collapsible pod connected to said elongated section which can be moved between an extended pod position and a retracted stowed position,
  (1) said collapsible pod including a load-carrying platform movable between an extended pod position and a retracted stowed position adjacent said elongated section,
  (2) closure means connected between said platform and said elongated section to form a substantially closed load-carrying chamber when said platform is in the extended position,
  (3) said closure means having sides which fold and unfold as the platform moves between its extended pod position and retracted stowed position,
  (4) said sides being double walled and fluid tight,
  (5) means for filling said walls with fluid, and
(c) means for moving said pod between its extended and stowed positions, (1) said means including connections between said load-carrying platform and said elongated section.
12. A crane helicopter having:
    (a) a fuselage with an elongated section,
    (b) a collapsible pod connected to said elongated section which can be moved between an extended pod position and a retracted stowed position,
        (1) said collapsible pod including a load-carrying platform movable between an extended pod position and a retracted stowed position adjacent said elongated section,
        (2) closure means connected between said platform and said elongated section to form a substantially closed load-carrying chamber when said platform is in the extended position,
        (3) said closure means being collapsible to the extent that it does not interfere with the movement of said platform between its extended position and its stowed position, and
    (c) means for moving said pod between its extended and stowed positions,
        (1) said means including cables between said load-carrying platform and said elongated section,
        (2) means for lengthening or shortening said cable between the platform and elongated section to move said platform.
13. A crane helicopter having a fuselage with an elongated section, a collapsible pod connected to said elongated section which can be moved between an extended pod position and a retracted stowed position, means for moving said pod between its extended and stowed positions, said pod having sides formed of a double thickness and airtight, and means for inflating said sides.

References Cited by the Examiner

UNITED STATES PATENTS

| 2,777,656 | 1/57 | Clifton | 244—118 X |
| 2,781,226 | 2/57 | Tydon | 244—118 X |

FOREIGN PATENTS 755,965   8/56   Great Britain.

MILTON BUCHLER, *Primary Examiner.*